US012200271B1

(12) United States Patent
Atkins et al.

(10) Patent No.: US 12,200,271 B1
(45) Date of Patent: *Jan. 14, 2025

(54) SIGNAL RESHAPING FOR HIGH DYNAMIC RANGE SIGNALS

(71) Applicant: DOLBY LABORATORIES LICENSING CORPORATION, San Francisco, CA (US)

(72) Inventors: Robin Atkins, Vancouver (CA); Peng Yin, Ithaca, NY (US); Taoran Lu, Santa Clara, CA (US); Jaclyn Anne Pytlarz, San Jose, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/899,400

(22) Filed: Sep. 27, 2024

Related U.S. Application Data

(60) Continuation of application No. 18/780,325, filed on Jul. 22, 2024, which is a continuation of application
(Continued)

(51) Int. Cl.
*H04N 19/82* (2014.01)
*H04N 1/60* (2006.01)
(Continued)

(52) U.S. Cl.
CPC ............ *H04N 19/87* (2014.11); *H04N 1/6058* (2013.01); *H04N 19/46* (2014.11); *H04N 19/85* (2014.11);
(Continued)

(58) Field of Classification Search
CPC ........ H04N 19/87; H04N 19/46; H04N 19/85; H04N 19/98; H04N 1/6058; G09G 2320/06; G09G 2340/06
See application file for complete search history.

(56) References Cited

U.S. PATENT DOCUMENTS 6,297,826 B1   10/2001   Semba
6,335,983 B1    1/2002   McCarthy et al.
(Continued)

FOREIGN PATENT DOCUMENTS

CN   101521001   9/2009
CN   101909215   12/2010
(Continued)

OTHER PUBLICATIONS

Andrivon, P. et al "SEI Message for Colour Mapping Information" JCT-VC) of ITU-T SG 16 WP 3 and ISO/IEC JTC1/SC 29/WG11, 17th Meeting, Valencia, ES, Mar. 27-Apr. 4, 2014.
(Continued)

*Primary Examiner* — Patrick E Demosky

(57) ABSTRACT

In a method to improve backwards compatibility when decoding high-dynamic range images coded in a wide color gamut (WCG) space which may not be compatible with legacy color spaces, hue and/or saturation values of images in an image database are computed for both a legacy color space (say, YCbCr-gamma) and a preferred WCG color space (say, IPT-PQ). Based on a cost function, a reshaped color space is computed so that the distance between the hue values in the legacy color space and rotated hue values in the preferred color space is minimized. HDR images are coded in the reshaped color space. Legacy devices can still decode standard dynamic range images assuming they are coded in the legacy color space, while updated devices can use color reshaping information to decode HDR images in the preferred color space at full dynamic range.

2 Claims, 8 Drawing Sheets

Related U.S. Application Data

No. 18/678,794, filed on May 30, 2024, now Pat. No. 12,120,358, which is a continuation of application No. 18/630,786, filed on Apr. 9, 2024, now Pat. No. 12,120,357, which is a continuation of application No. 18/616,959, filed on Mar. 26, 2024, now Pat. No. 12,041,275, which is a continuation of application No. 18/405,874, filed on Jan. 5, 2024, now Pat. No. 12,028,555, which is a continuation of application No. 18/385,724, filed on Oct. 31, 2023, now Pat. No. 11,910,025, which is a continuation of application No. 18/215,129, filed on Jun. 27, 2023, now Pat. No. 11,924,477, which is a continuation of application No. 17/992,603, filed on Nov. 22, 2022, now Pat. No. 11,785,263, which is a continuation of application No. 17/234,815, filed on Apr. 20, 2021, now Pat. No. 11,582,490, which is a division of application No. 16/532,924, filed on Aug. 6, 2019, now Pat. No. 11,025,961, which is a continuation of application No. 15/749,231, filed as application No. PCT/US2016/045362 on Aug. 3, 2016, now Pat. No. 10,432,977.

(60) Provisional application No. 62/302,073, filed on Mar. 1, 2016, provisional application No. 62/300,012, filed on Feb. 25, 2016, provisional application No. 62/278,362, filed on Jan. 13, 2016, provisional application No. 62/202,980, filed on Aug. 10, 2015, provisional application No. 62/200,797, filed on Aug. 4, 2015.

(51) Int. Cl.
  H04N 19/46 (2014.01)
  H04N 19/85 (2014.01)
  H04N 19/87 (2014.01)
  H04N 19/98 (2014.01)

(52) U.S. Cl.
  CPC ......... *H04N 19/98* (2014.11); *G09G 2320/06* (2013.01); *G09G 2340/06* (2013.01)

(56) References Cited

U.S. PATENT DOCUMENTS

| | | | |
|---|---|---|---|
| 8,837,825 | B2 | 9/2014 | Su |
| 9,053,523 | B2 | 6/2015 | Sarkar |
| 2003/0053689 | A1 | 3/2003 | Watanabe |
| 2004/0199346 | A1 | 10/2004 | Stokes |
| 2006/0244983 | A1 | 11/2006 | Zeng |
| 2007/0223016 | A1 | 9/2007 | Ichitani |
| 2007/0285434 | A1 | 12/2007 | Lin |
| 2008/0013135 | A1 | 1/2008 | Hsu |
| 2009/0220151 | A1 | 9/2009 | Lin |
| 2009/0285434 | A1 | 11/2009 | Williams |
| 2010/0085487 | A1 | 4/2010 | Sarkar |
| 2011/0007088 | A1 | 1/2011 | Park |
| 2012/0142285 | A1 | 6/2012 | Tsuchida |
| 2013/0328907 | A1 | 12/2013 | Ballestad et al. |
| 2014/0044352 | A1 | 2/2014 | Sarkar |
| 2014/0363093 | A1 | 12/2014 | Miller |
| 2016/0309059 | A1 | 10/2016 | Tourapis |
| 2017/0006273 | A1 | 1/2017 | Borer |
| 2017/0026646 | A1 | 1/2017 | Minoo |
| 2017/0048400 | A1 | 2/2017 | Berfanger |
| 2017/0085895 | A1 | 3/2017 | Gu |
| 2017/0134731 | A1 | 5/2017 | Tourapis |
| 2017/0171565 | A1 | 6/2017 | Le Leannec |
| 2017/0251211 | A1 | 8/2017 | Froehlich et al. |
| 2018/0131938 | A1 | 5/2018 | Lu |
| 2018/0160126 | A1 | 6/2018 | Andersson |
| 2018/0160127 | A1 | 6/2018 | Ström |
| 2018/0242006 | A1 | 8/2018 | Kerofsky |
| 2018/0249166 | A1 | 8/2018 | Leleannec |
| 2018/0278967 | A1 | 9/2018 | Kerofsky |
| 2018/0300862 | A1 | 10/2018 | Keating |
| 2018/0324329 | A1 | 11/2018 | Thebault |
| 2018/0332286 | A1 | 11/2018 | Pettersson |
| 2019/0052908 | A1 | 2/2019 | Mertens |
| 2019/0068939 | A1 | 2/2019 | Kang |
| 2019/0124367 | A1 | 4/2019 | Lu |
| 2019/0373233 | A1 | 12/2019 | Ström |
| 2020/0043149 | A1 | 2/2020 | Partin |

FOREIGN PATENT DOCUMENTS

| | | | |
|---|---|---|---|
| CN | 101977329 | | 2/2011 |
| CN | 103973938 B | | 8/2014 |
| EP | 0586204 | | 3/1994 |
| EP | 3340165 A1 | | 6/2018 |
| JP | H06-189331 | | 7/1994 |
| JP | 2004-040448 | | 2/2004 |
| JP | 2005-079834 | | 3/2005 |
| JP | 2005-184601 | | 7/2005 |
| JP | 2008-040305 | | 2/2008 |
| JP | 2010-263437 | | 11/2010 |
| JP | 2012-156739 | | 8/2012 |
| JP | 5141557 | | 2/2013 |
| KR | 10-1166388 | | 7/2012 |
| RU | 2335017 | | 9/2008 |
| RU | 2350041 C2 | | 3/2009 |
| TW | 201446215 | | 12/2014 |
| UA | 26453 | | 9/2007 |
| WO | 2012/142285 | | 10/2012 |
| WO | 2014/130343 | | 8/2014 |
| WO | 2014/160705 | | 10/2014 |
| WO | 2014204865 | | 12/2014 |
| WO | 2015/102449 | | 7/2015 |
| WO | 2016/172091 | | 10/2016 |
| WO | WO-2016186547 A1 * | 11/2016 | ............... G09G 5/02 |
| WO | WO-2016195576 A1 * | 12/2016 | ............... H04N 1/60 |
| WO | WO-2017010924 A1 * | 1/2017 | ........... H04N 19/182 |
| WO | 2018114509 A1 | | 6/2018 |
| WO | 2018175337 | | 9/2018 |

OTHER PUBLICATIONS

Baylon, D. et al. "Response to Call for Evidence for HDR and WCG Video Coding: Arris, Dolby and InterDigital", document ISO/IEC JTC1/SC29/WG11 MPEG2015/m36264, 112nd MPEG meeting, Warsaw, Poland, Jul. 2015.

Bordes, P. et al "Colour Mapping SEI Message", Joint Collaborative Team on Video Coding (JCT-VC) of ITU-T SG 16 WP3 and ISO/IEC JTC1/SC29/WG11, 14th Meeting Vienna, AT, Jul. 25-Aug. 2, 2013, published on Jul. 2013.

Boyce, J. et al "Draft High Efficiency Video Coding (HEVC) version 2, combined Format Range Extensions (RExt), Scalability (SHVC), and Multi-View (MV-HEVC) Extensions" 18th Meeting, Sapporo, JP Jun. 30-Jul. 9, 2014, pp. 1-376.

C. Poynton, J. Stessen and R. Nijland, "Deploying Wide Color Gamut and High Dynamic Range in HD and UHD," in SMPTE Motion Imaging Journal, vol. 124, No. 3, pp. 37-49, Apr. 2015, doi: 10.5594/j18530. (Year: 2015).

D. Rusanovskyy, D. B. Sansli, A. Ramasubramonian, S. Lee, J. Sole and M. Karczewicz, "High Dynamic Range Video Coding with Backward Compatibility," 2016 Data Compression Conference (DCC), Snowbird, UT, USA, 2016, pp. 289-298, doi: 10.1109/DCC. 2016.78. (Year: 2016).

E. Francois, C. Fogg, "High Dynamic Range and Wide Color Gamut Video Coding in HEVC: Status and Potential Future Enhancements," in IEEE Transactions on Circuits and Systems for Video Technology, vol. 26, No. 1, pp. 63-75, Jan. 2016, doi: 10.1109/TCSVT.2015.2461911 (Year: 2016).

Ebner F. et al., "Development and testing of a color space (ipt) with improved hue uniformity", Proc. 6th Color Imaging Conference: Color Science Systems and Applications, IS&T, Scottsdale Arizona, pp. 8-13, Nov. 1998.

(56) References Cited

OTHER PUBLICATIONS

Francois, E. et al 'Common Test Conditions for HDR/WCG video coding experiments', (JCTVC-X1020), JCT-VC of ITU-T SG 16 WP 3 and ISO/IEC JTC 1/SC 29/WG 11 24th Meeting: Geneva, CH, (Jul. 11, 2016).
Francois, E. et al., 'AHG14: suggested draft text for HDR/WCG technology for SDR backward compatibility, display adaptation, and quality enhancement processing', (JCTVC-Y0029), JCT-VC of ITU-T SG 16 WP.
HDR-TV http://www.soumu.go.jp/main_content/000402269.pdf.
ITU-R WP 6C via SC 29 SECRETARIAT: "Liaison Statement from ITU-R WP 6C", 114. MPEG Meeting; Feb. 22, 2016-Feb. 26, 2016; San Diego; (Motion Picture Expert Group or ISO/IEC JTC1/SC29/WG11), No. m37788 Feb. 12, 2016 (Feb. 12, 2016), XP030268348, Retrieved from the Internet: URL:http://phenix.int-evry.fr/mpeg/doc_end_user/documents/114_San%20Diego/wg11/m37788-v1-m37788.zip29n156263.doc [retrieved on Feb. 12, 2016] figure 24.
Kim, Hwi-Gang et al "Color Correction Using Rotation Matrix for HDR Rendering in iCAM06", IEEE International Conference on Computer Vision Workshops, Nov. 6, 2011, pp. 738-744.
Kuang et al: "iCAM06: a refined image appearance model for HDR image rendering", Journal of Visual Communication and Image Representation, Academic Press, Inc, US, vol. 18, No. 5, Sep. 5, 2007 (Sep. 5, 2007), pp. 406-414, XP022231047.
Lu, T. et al "ITP Colour Space and Its Compression Performance for High Dynamic Range and Wide Colour Gamut Video Distribution" ZTE Communications, Feb. 2016, vol. 14, No. 1, pp. 32-38.
Miller, S. et al "Perceptual Signal Coding for More Efficient Usage of Bit Codes" in SMPTE Motion Imaging Journal vol. 122, No. 4, pp. 52-59, May 2013.
Pytlarz, J. et al "Overview of IPT-PQ Color Space" ISO/IEC JTC1/SC29/WG11, Oct. 2015, Geneva Switzerland.
Pytlarz, Jaclyn "Overview of ICtCp" JCT-VC of ITU-T SG 16 WP 3, 23rd meeting: San Diego, US, Feb. 19-26, 2016.
Shipsides, Andy "High Dynamic Range Explained" Abel Cine, Mar. 6, 2015, Tutorials & Guides.
SMPTE ST 2084:2014, "High Dynamic Range EOTF of Mastering Reference Displays", Aug. 16, 2014.
Tania Pouli: "Statistics of Image Categories for Computer Graphics Applications", Ph.D. thesis, Feb. 1, 2011 (Feb. 1, 2011), pp. 1-255, XP055039075, Retrieved from the Internet: http://taniapouli.co.uk/research/tania _pouli_thesis.pdf [retrieved on Sep. 25, 2012] pp. 184-186.
Wikipedia "YCbCr: Difference between Revisions" downloaded Mar. 25, 2019 but viewing the historical record published Jul. 7, 2015.
Zhang, Q. "A Novel Color space Based on RGB Color Barycenter" IEEE International conference on Acoustics, Speech and Signal Processing, 2016, pp. 1601-1605.
Zhu, Y. "Color Correction Based on LMS and RGB subspace" Proc. of SPIE, vol. 6043, Bellingham, Nov. 3, 2005.

\* cited by examiner

SIGNAL RESHAPING FOR HIGH DYNAMIC RANGE SIGNALS

CROSS-REFERENCE TO RELATED APPLICATIONS

This application is a continuation of U.S. patent application Ser. No. 18/780,325, filed on Jul. 22, 2024, which is a continuation of U.S. patent application Ser. No. 18/678,794, filed on May 30, 2024, now U.S. Pat. No. 12,120,358, which is a continuation of U.S. patent application Ser. No. 18/630,786, filed on Apr. 9, 2024, now U.S. Pat. No. 12,120,357, which is a continuation of U.S. patent application Ser. No. 18/616,959, filed on Mar. 26, 2024, now U.S. Pat. No. 12,041,275, which is a continuation of U.S. patent application Ser. No. 18/405,874, filed on Jan. 5, 2024, Now U.S. Pat. No. 12,028,555, which is a continuation of U.S. patent application Ser. No. 18/385,724, filed on Oct. 31, 2023, now U.S. Pat. No. 11,910,025, which is a continuation of U.S. patent application Ser. No. 18/215,129, filed on Jun. 27, 2023, now U.S. Pat. No. 11,924,477, which is a continuation of U.S. patent application Ser. No. 17/992,603, filed on Nov. 22, 2022, now U.S. Pat. No. 11,785,263, which is a continuation of U.S. patent application Ser. No. 17/234,815, filed on Apr. 20, 2021, now U.S. Pat. No. 11,582,490, which is a divisional of U.S. patent application Ser. No. 16/532,924, filed on Aug. 6, 2019, now U.S. Pat. No. 11,025,961, which is a continuation of U.S. patent application Ser. No. 15/749,231, filed on Jan. 31, 2018, now U.S. Pat. No. 10,432,977, which is the national stage entry for PCT/US2016/045362, filed on Aug. 3, 2016, which claims the benefit of priority from U.S. Provisional Application Ser. No. 62/302,073, filed on Mar. 1, 2016, U.S. Provisional Application Ser. No. 62/300,012, filed on Feb. 25, 2016, U.S. Provisional Application Ser. No. 62/278,362, filed on Jan. 13, 2016, U.S. Provisional Application Ser. No. Ser. No. 62/202,980, filed on Aug. 10, 2015, and U.S. Provisional Application Ser. No. 62/200,797 filed on Aug. 4, 2015, each of which is incorporated herein by reference in its entirety.

TECHNOLOGY

The present document relates generally to images. More particularly, an embodiment of the present invention relates to signal reshaping of images with high dynamic range to improve backwards compatibility.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest whites (i.e., highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Given a video stream, information about its coding parameters is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR. As appreciated by the inventors here, improved techniques for the coding of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
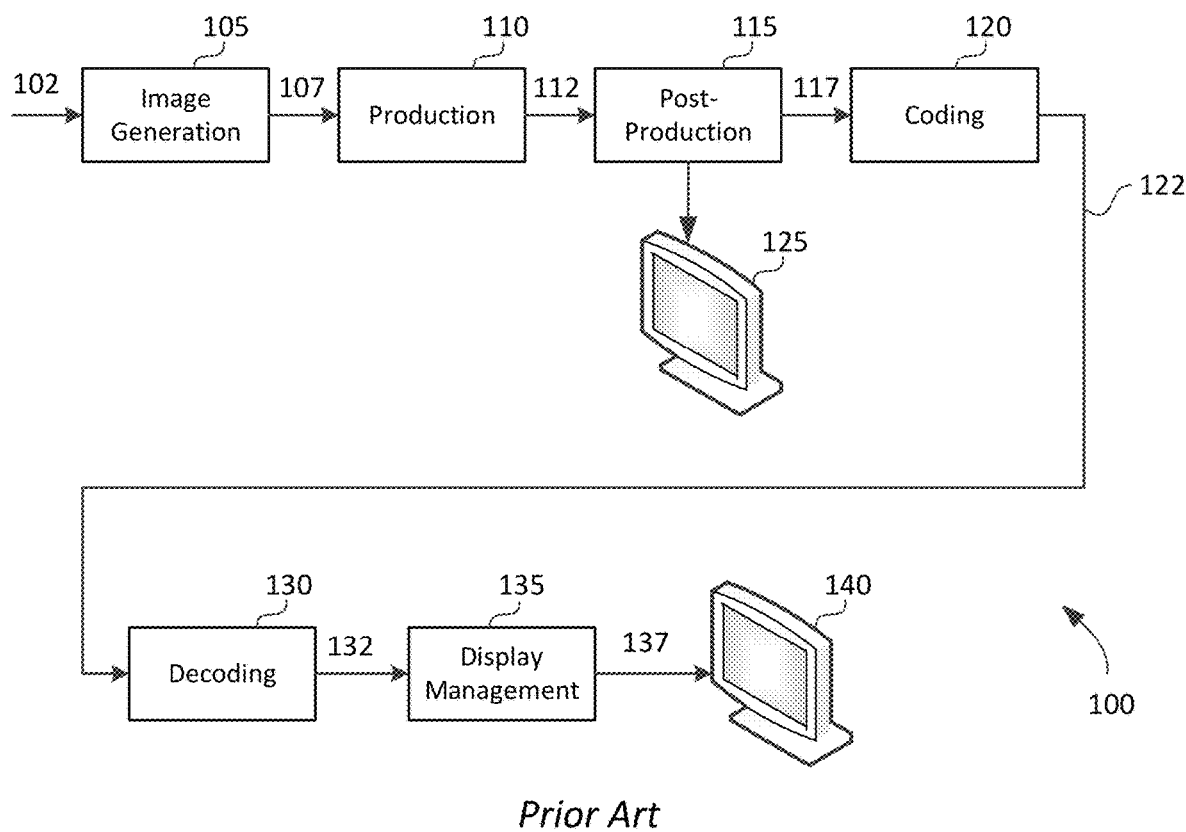
FIG. 1 depicts an example process for a video delivery pipeline according to prior art.

Signal reshaping and coding of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the reshaping and coding of high-dynamic range images. In a method to improve backward compatible decoding, in an encoder, a processor accesses an image database and
  computes first hue values of the images in the database in a first color space;
  computes second hue values of the images in the database in a second color space;
  computes a hue rotation angle based on minimizing a hue cost function, wherein the hue cost function is based on a difference measure of the first hue values and rotated second hue values; and
  generates a color-rotation matrix based on the hue rotation angle.

In an embodiment, the first color space is a gamma-based YCbCr color space and the second color space is a PQ-based IPT color space.

In an embodiment, the color-rotation matrix is used to generate a reshaped color space based on the preferred color space. Images are coded using the reshaped color space, and information about the color rotation matrix is signaled from the encoder to a decoder.

In an embodiment, in a decoder, in a method to reconstruct an input image coded in a reshaped color space, the decoder:
  receives a coded input image in a reshaped color space, wherein the reshaped color space is generated by rotating chroma components of a preferred color space to approximate one or more parameters of a legacy color space;
  accesses metadata transmitted from an encoder to the decoder, wherein the metadata is associated with the coded input image and comprise:
    a flag indicating the presence or not of a color-rotation and scaling matrix; and
    a plurality of coefficients for the color-rotation and scaling matrix when the flag indicates the presence of the color-rotation and scaling matrix;
  decodes the coded input image to generate a decoded image in the reshaped color space; and
  generates a decoded image in the preferred color space based on the decoded image in the reshaped color space and the color-rotation and scaling matrix.

In another embodiment, in an encoder, a processor:
  receives an input image in a preferred color space;
  accesses a hue rotation function, wherein for a hue value of a pixel in the input image in the preferred color space, the hue rotation function generates a rotated hue output value that matches according to a hue-cost criterion a hue value in a legacy color space;
  generates a reshaped image based on the input image and the hue rotation function; and
  encodes the reshaped image to generate a coded reshaped image.

In another embodiment, in a decoder, a processor:
  accesses an input image encoded in a reshaped color space;
  accesses metadata associated with the input image, wherein the metadata comprise data associated with a hue rotation function used to translate the input image from a preferred color space to the reshaped color space, wherein for a hue value of a pixel in the input image in the preferred color space, the hue rotation function generates a rotated hue output value that matches according to a hue-cost criterion a hue value in a legacy color space; and
  generates an output image in the preferred color space based on the input image and the data associated with the hue rotation function.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

The IPT-PQ Color Space

In a preferred embodiment, without limitation, part of the processing pipeline, for example, coding (120), decoding (130), and display management (135) may be performed in what will be referred to as the IPT-PQ color space. An example use of the IPT-PQ color space for display management application can be found in "Display Management for High Dynamic Range Video," WIPO Publication WO 2014/130343, by R. Atkins et al., which is incorporated by reference in its entirety. The IPT color space, as described in "*Development and testing of a color space (ipt) with improved hue uniformity*", by F. Ebner and M. D. Fairchild, in Proc. 6$^{th}$ Color Imaging Conference: Color Science, Systems, and Applications, IS&T, Scottsdale, Arizona, November 1998, pp. 8-13 (to be referred to as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency (ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in U.S. Pat. No. 9,077,994 (to be referred as the '994 Patent)," by J. S. Miller et al., which is incorporated herein by reference in its entirety, parts of which have been adopted by the SMPTE ST 2084:2014 specification, titled "High Dynamic Range Electro-optical Transfer Function of Mastering Reference Displays," Aug. 16, 2014, incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '994 Patent, imitates the true visual response of the human visual system using a relatively simple functional model.

Figure 2:
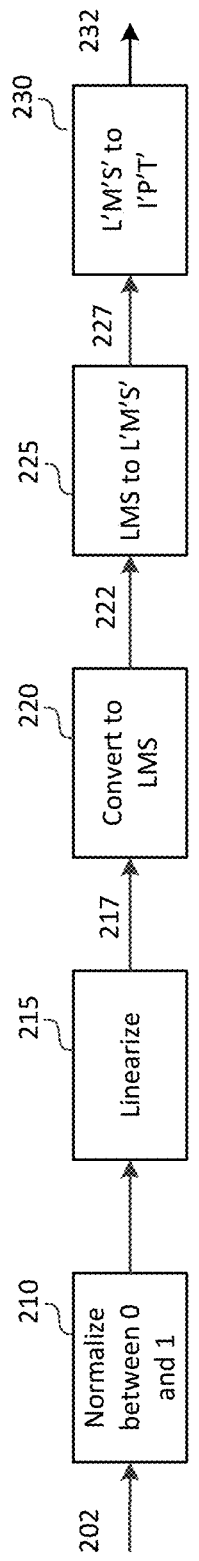
FIG. 2 depicts an example process for color conversion to the IPT-PQ color space.

FIG. 2 depicts in more detail an example process (200) for the color conversion into the IPT-PQ color space according to an embodiment. As depicted in FIG. 2, given input signal (202) which is in a first color space (e.g., RGB), the color space transformation in the perceptually-corrected IPT color space (IPT-PQ) may comprise the following steps:

a) Optional step (210) may normalize the pixel values of the input signal (202) (e.g., 0 to 4095) into pixel values with a dynamic range between 0 and 1.
  b) If the input signal (202) is gamma-coded or PQ-coded (e.g., per BT. 1866 or SMPTE ST 2084), optional step (215) may use the signal's electro-optical transfer function (EOTF) (as provided by signal metadata) to reverse or undo the source display's conversion from code values to luminance. For example, if the input signal is gamma coded, then this step applies an inverse gamma function. If the input signal is PQ-encoded according to SMPTE ST 2084, then this step applies an inverse PQ function. In practice, the normalization step (210) and the inverse non-linear encoding (215) may be performed using pre-computed 1-D Look-up tables (LUTs) to generate a linear signal 217.
  c) In step (220), linear signal 217 is converted from its original color space (e.g., RGB, XYZ, and the like) into the LMS color space. For example, if the original signal is in RGB, then this step may comprise two steps: an RGB to XYZ color transformation and an XYZ to LMS color transformation. In an embodiment, without limitation, the XYZ to LMS transformation may be given by $$\begin{pmatrix} L \\ M \\ S \end{pmatrix} = \begin{pmatrix} 0.4002 & 0.7076 & -0.0808 \\ -0.2263 & 1.1653 & 0.0457 \\ 0 & 0 & 0.9182 \end{pmatrix} \begin{pmatrix} X \\ Y \\ Z \end{pmatrix}. \quad (1a)$$

In another embodiment, as described in U.S. Provisional Patent Application Ser. No. 62/056,093, filed on Sep. 26, 2014, titled "Encoding and decoding perceptually-quantized video content," (filed also as PCT/US2015/051964, on Sep. 24, 2015) which is incorporated herein by reference in its entirety, the overall coding efficiency in the IPT-PQ color space may be further increased if one incorporates a cross-talk matrix $$\begin{pmatrix} 1-2c & c & c \\ c & 1-2c & c \\ c & c & 1-2c \end{pmatrix}$$

as part of the XYZ to LMS transformation. For example, for c=0.02, multiplying the cross-talk matrix with the 3×3 matrix in equation (1a) yields:

$$\begin{pmatrix} L \\ M \\ S \end{pmatrix} = \begin{pmatrix} 0.3797 & 0.7026 & -0.0583 \\ -0.2092 & 1.1329 & 0.0606 \\ 0.0035 & 0.0375 & 0.8808 \end{pmatrix} \begin{pmatrix} X \\ Y \\ Z \end{pmatrix}. \quad (1b)$$

Similarly, for c=0.04, in another embodiment, multiplying the cross-talk matrix with the original XYZ to LMS matrix (e.g., equation (1a)) yields:

$$\begin{pmatrix} L \\ M \\ S \end{pmatrix} = \begin{pmatrix} 0.359132 & 0.697604 & -0.03578 \\ -0.192188 & 1.10038 & 0.07554 \\ 0.006956 & 0.074916 & 0.84334 \end{pmatrix} \begin{pmatrix} X \\ Y \\ Z \end{pmatrix}. \quad (1c)$$

d) According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in step (225) the traditional power function for a non-linear encoding of LMS to IPT is replaced with the PQ non-linear encoding of each one of the L, M, and S components.

e) Using an LMS to IPT linear transform (e.g., as defined in the Ebner paper), step (230) completes the conversion of signal 222 to the IPT-PQ color space. For example, in an embodiment, the L'M'S' to IPT-PQ transform may be given by $$\begin{pmatrix} I' \\ P' \\ T' \end{pmatrix} = \begin{pmatrix} 0.400 & 0.4000 & 0.2000 \\ 4.4550 & -4.8510 & 0.3960 \\ 0.8056 & 0.3572 & -1.1628 \end{pmatrix} \begin{pmatrix} L' \\ M' \\ S' \end{pmatrix}. \quad (2a)$$

In another embodiment, experiments have shown that it may be preferred that the I' component may be derived without any dependency on the S' component, hence equation (2a) may become:

$$\begin{pmatrix} I' \\ P' \\ T' \end{pmatrix} = \begin{pmatrix} 0.500 & 0.5000 & 0 \\ 4.4550 & -4.8510 & 0.3960 \\ 0.8056 & 0.3572 & -1.1628 \end{pmatrix} \begin{pmatrix} L' \\ M' \\ S' \end{pmatrix}. \quad (2b)$$

IPT-PQ Versus YCbCr-Gamma

Most of the existing video compression standards, such as MPEG-1, MPEG-2, AVC, HEVC, and the like, have been tested, evaluated, and optimized for gamma-coded images in the YCbCr color space; however, experimental results have shown that the IPT-PQ color space may provide a better representation format for high-dynamic range images with 10 or more bits per pixel per color component. Signal encoding in color spaces that are better suited for HDR and wide color gamut signals (e.g., IPT-PQ) may yield better overall picture quality; however, legacy decoders (e.g., set-top boxes and the like) may be unable to do proper decoding and color conversion. To improve backwards compatibility, so that even devices that are not aware of the new color spaces can generate a reasonable picture, as appreciated by the inventors, new signal reshaping techniques are needed.

Figure 3:
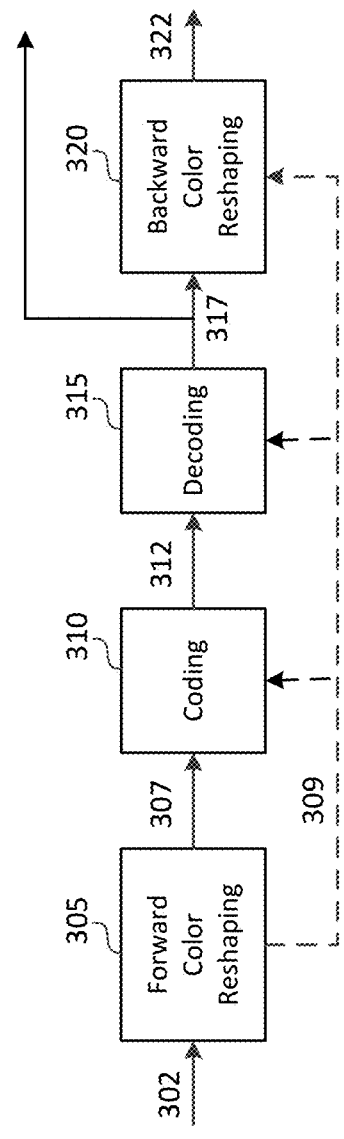
FIG. 3 depicts an example process for signal reshaping and coding.

FIG. 3 depicts an example process for signal reshaping and coding according to an embodiment. As depicted in FIG. 3, given input (302), the forward color reshaping block (305) applies, as needed, color transformation and or reshaping functions to generate a signal (307) in a preferred color space (e.g., IPT-PQ-r). Reshaping-related metadata (309) may also be generated and communicated to subsequent blocks of the coding pipeline, such as the encoder (310), the decoder (315), and backward color reshaping (320).

A decoder, after receiving coded signal (315) will apply decoding (315) (such as HEVC decoding) to generate decoded signal (317). A decoder aware of the preferred HDR-WCG coding color space (e.g., IPT-PQ-r), will apply a proper backward or reverse reshaping (320) to generate a signal (322) in the proper color space (say, IPT-PQ). Then, signal (322) may be transformed to YCbCr or RGB for additional post-processing, storage, or display.

A legacy decoder, which is not aware of the preferred HDR-WCG coding space, may treat the HDR-WCG space as a legacy color space (e.g., gamma-coded YCbCr); however, due to the forward color reshaping (305), output (317) may still have a reasonable picture quality, despite the fact that no backward reshaping or other color transformation is applied to output (317) of the decoder.

Color Reshaping

Consider, without loss of generality, the IPT-PQ color space. In an embodiment, a linear reshaping matrix (e.g., a 3×3 matrix) is generated to perceptually match the skin tones in an IPT-PQ signal with the skin-tones in a YCbCr-gamma signal. Such a color transformation has no effect on the performance of most image processing applications in the IPT color space, yet greatly improves color reproduction by a legacy device. Instead of or in addition of skin tones, similar transformation matrices may also be generated to match other important colors, such as foliage, sky, etc. In an embodiment, the reshaping matrix may be computed as follows:

a) Load a database of skin-tone colors, for example, reflectance spectrums, and convert them to a device independent color space, such as XYZ;

b) Convert the database of skin tones from XYZ into the legacy color space format (e.g., YCbCr, Rec. 709). This step may include, for example, the following substeps:

b.1) Convert the database to RGB (Rec. 709);

b.2) Apply a gamma to the RGB values (e.g., per BT. 1886) to generate a gamma-coded R'G'B' signal;

b.3) Convert the R'G'B' signals to YCbCr-gamma values (e.g., per Rec. 709);

b.4) Compute Hue (e.g., $$\text{Hue}_{YCbC_r} = \tan^{-1}\left(\frac{Cr}{Cb}\right)$$

values of the YCbCr-gamma signals;

b.5) Compute saturation values (e.g., $$Sat_{YCbCr} = \sqrt{Cb^2 + Cr^2}\,)$$

of the YCbCr-gamma signals;

c) Compute the skin tone values in the database in the preferred color format (e.g. IPT-PQ). This step may include the following sub-steps:

c.1) Convert XYZ to LMS;

c.2) Convert LMS to L'M'S' and to I'P'T' by applying PQ (e.g., per ST 2084);

c.3) Compute Hue values (e.g., $$\text{Hue}_{IPT} = \tan^{-1}\left(\frac{T'}{P'}\right);$$

c.4) Compute Saturation values $$\left(Sat_{IPT} = \sqrt{T'^2 + P'^2}\,\right);$$

d) Compute a rotation matrix to rotate the IPT values so that skin tones in a rotated or reshaped IPT-PQ (e.g., IPT-PQ-r) are aligned with skin tones in YCbCr-gamma. In an embodiment, this step is computed by optimizing a cost function related to the hue and saturation values of the samples in the two color spaces. For example, in an embodiment the cost function may represent the mean square error (MSE) between the legacy color space (e.g., YCbCr) and the rotated preferred HDR color space (e.g., IPT-PQ). For example, Let $$Cost_H = \sum_i (Hue_{YCbCr}(i) - Hue_{IPT-PQ-r}(i))^2, \quad (3)$$

denote a hue-related cost function, where $Hue_{IPT-PQ-r}$ denotes the hue of the reshaped color (that is, IPT-PQ-r) and can be defined as $$Hue_{IPT-PQ-r}(i) = \tan^{-1}\left(\frac{\sin(a) * P'(i) + \cos(a) * T'(i)}{\cos(a) * P'(i) - \sin(a) * T'(i)}\right), \quad (4)$$

where all inverse tan functions are computed in $(-\pi, \pi)$.

In an embodiment, one may apply any known in the art optimization techniques to find the value of angle "a", to be denoted as a', to minimize the cost function according to a given criterion. For example, one may apply the MATLAB function fminunc(fun, x0), with fun=$Cost_H$ and x0=0.1. Given a', the rotation matrix R may be defined as $$R = \begin{bmatrix} 1 & 0 & 0 \\ 0 & \cos(a') & \sin(a') \\ 0 & -\sin(a') & \cos(a') \end{bmatrix}. \quad (5)$$

As an example, based on a sample database, in an embodiment, for a'=71.74 degrees $$R = \begin{bmatrix} 1 & 0 & 0 \\ 0 & 0.3133 & 0.9496 \\ 0 & -0.9496 & 0.3133 \end{bmatrix}. \quad (6)$$

Given R and the original L'M'S' to I'P'T' matrix LMS2IPTmat (see for example, equation (2)), the conversion to the reshaped IPT-PQ-r color space may use a new LMS2IPTmat-r matrix defined as:

$$LMS2IPTmat-r = R^T * LMS2IPTmat = ((LMS2IPTmat^T * R))^T, \quad (7)$$

where $A^T$ denotes the transpose of matrix A.

In an embodiment, in addition to aligning the hues for the skin tones, one may also align the saturation. This may include the following steps:

a) Apply R to the original IPT-PQ data to generate color-rotated chroma values $P_R$ and $T_R$ data b) Define a saturation cost function, e.g., the MSE between saturation values in the original and target color spaces:

$$Cost_S = \sum_i (Sat_{YCbCr}(i) - Sat_{IPT-PQ-r}(i))^2, \quad (8)$$

where, $$Sat_{IPT-PQ-r}(i) = b * \sqrt{P_R^2(i) + T_R^2(i)}, \quad (9)$$

and c) Let b' denote the b value that optimizes $Cost_S$. Then, one can apply a scaling vector $$S = \begin{bmatrix} 1 \\ b' \\ b' \end{bmatrix} \quad (10)$$

to the chroma rotation matrix to form a single color-rotation and scaling 3×3 matrix $$R_S = \begin{bmatrix} 1 & 0 & 0 \\ 0 & \cos(a') * b' & \sin(a') * b' \\ 0 & -\sin(a') * b' & \cos(a') * b' \end{bmatrix}. \quad (11)$$

In some embodiment, the hue-cost and saturation-cost functions (e.g., equations (3) and (8)) may be combined into a single hue/saturation cost function and solved for both a' and b' simultaneously. For example, from equation (11), in an embodiment, for $$R_S = \begin{bmatrix} 1 & 0 & 0 \\ 0 & \cos(a') * b1' & \sin(a') * b2' \\ 0 & -\sin(a') * b3' & \cos(a') * b4' \end{bmatrix}, \quad (12)$$

equation (4) can be modified as $$Hue_{IPT-PQ-r}(i) = \tan^{-1}\left(\frac{b2 * \sin(a) * P'(i) + b4 * \cos(a) * T'(i)}{b1 * \cos(a) * P'(i) - b3 * \sin(a) * T'(i)}\right), \quad (13)$$

and one can solve equation (3) for both the optimum a' and the optimum bi' (i=1 to 4) scaling factors.

For example, in an embodiment, for a'=65 degrees and b1'=1.4, b2'=1.0, b3'=1.4, and b4'=1.0, equation (12) yields:

$$R_S = \begin{bmatrix} 1 & 0 & 0 \\ 0 & 0.591666 & 0.906308 \\ 0 & -1.26883 & 0.422618 \end{bmatrix}. \quad (12b)$$

Tone Reshaping

The proposed rotation matrix R may improve the color reproduction; however, the decoded image (317) may still be perceived to have low contrast due to the difference in the non-linear EOTF encoding functions (e.g., ST 2084 versus BT 1866). In an embodiment, the contrast may be improved by applying a 1-D tone-mapping curve to the luminance channel (e.g., I'). This step may include the following sub-steps:

a) Apply a tone-mapping curve (e.g., a sigmoid) to map the original content from an original HDR maximum brightness (e.g., 4,000 nits) to an SDR target brightness (e.g., 100 nits). An example of such a sigmoid function may be found in U.S. Pat. No. 8,593,480, "Method and Apparatus for Image Data Transformation," by A. Ballestad and A. Kostin, which is incorporated herein by reference in its entirety. Examples of alternative reshaping functions were also disclosed in WIPO Publication WO 2014/160705, "Encoding perceptually-quantized video content in multi-layer VDR coding," which is incorporated herein by reference in its entirety. Let $I'_T = f(I')$ denote the output of the tone mapping function $f( )$, then b) Linearize $I'_T$ (e.g., apply an inverse PQ or gamma function) to generate linear $I_T$ data; and c) Apply legacy EOTF encoding (e.g., BT. 1866) encoding to the linearized $I_T$ signal to generate a gamma-coded luminance signal to be compressed and transmitted by the encoder.

Figure 4:
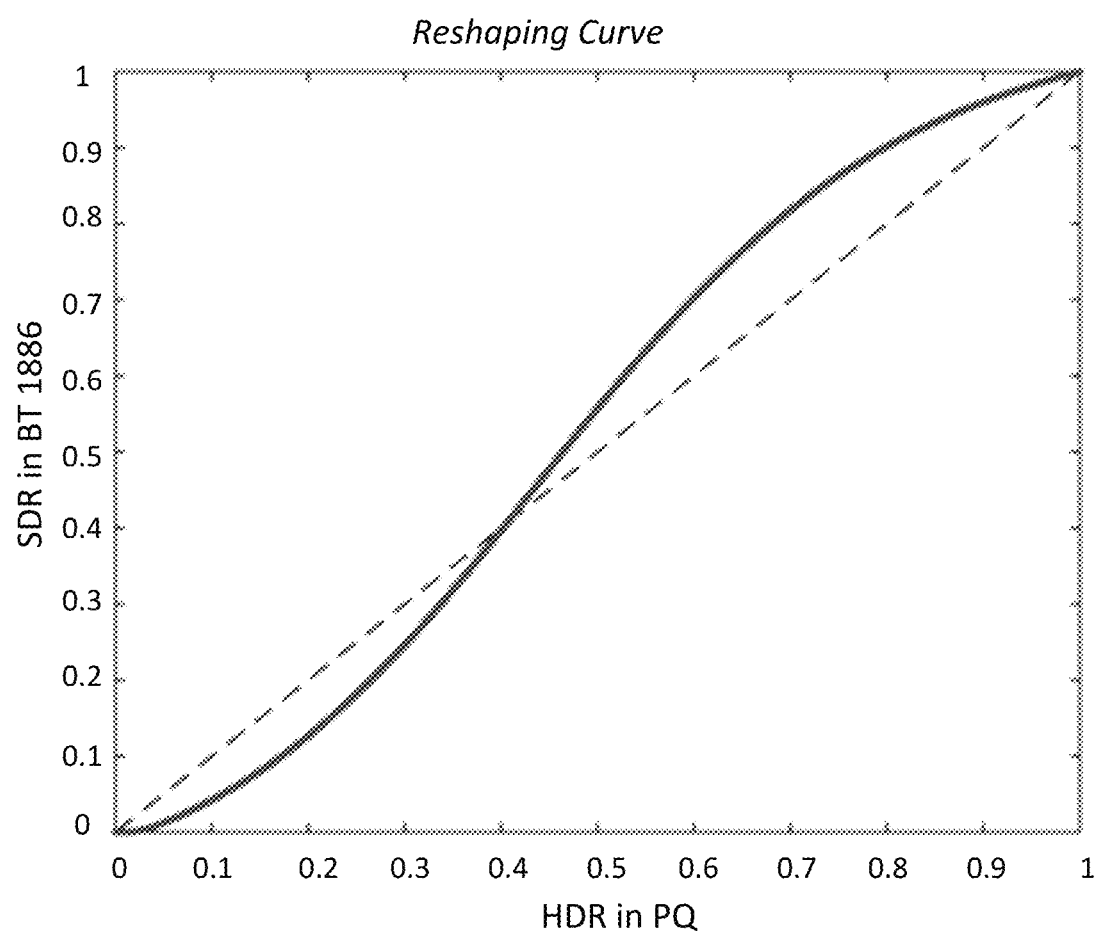
FIG. 4 depicts an example tone-mapping curve for luminance reshaping between ST 2084 IPT and BT 1866 IPT according to an embodiment of this invention.

An example of such mapping between ST 2084 (PQ) and BT 1866 is shown in FIG. 4. The curve has higher mid-tone contrast, lower blacks, and brighter (with less contrast) highlights. This aligns the tone scale more closely with standard SDR, so that when the input is decoded by a legacy device the image is still viewable. In FIG. 4, without loss of generality, input and output values are normalized to (0, 1).

Reshaping information may be signaled from an encoder to the rest of the pipeline as metadata. The reshaping parameters may be determined at a variety of time instances, such as on a per frame basis, on a per scene basis, or on a per sequence basis, to yield the best possible performance for a given video sequence.

Although this description focuses on the IPT-PQ color space, these techniques are equally applicable to other color spaces and color formats. For example, similar techniques may be applied to improve backward compatibility across different versions of YCbCr, for example, Rec. 709 YCbCr and Rec. 2020 YCbCr. Thus, in an embodiment, a Rec. 2020 bitstream may be adjusted using signal reshaping techniques as described herein to provide better hue and saturation output when decoded using a legacy Rec. 709 decoder.

Figure 6:
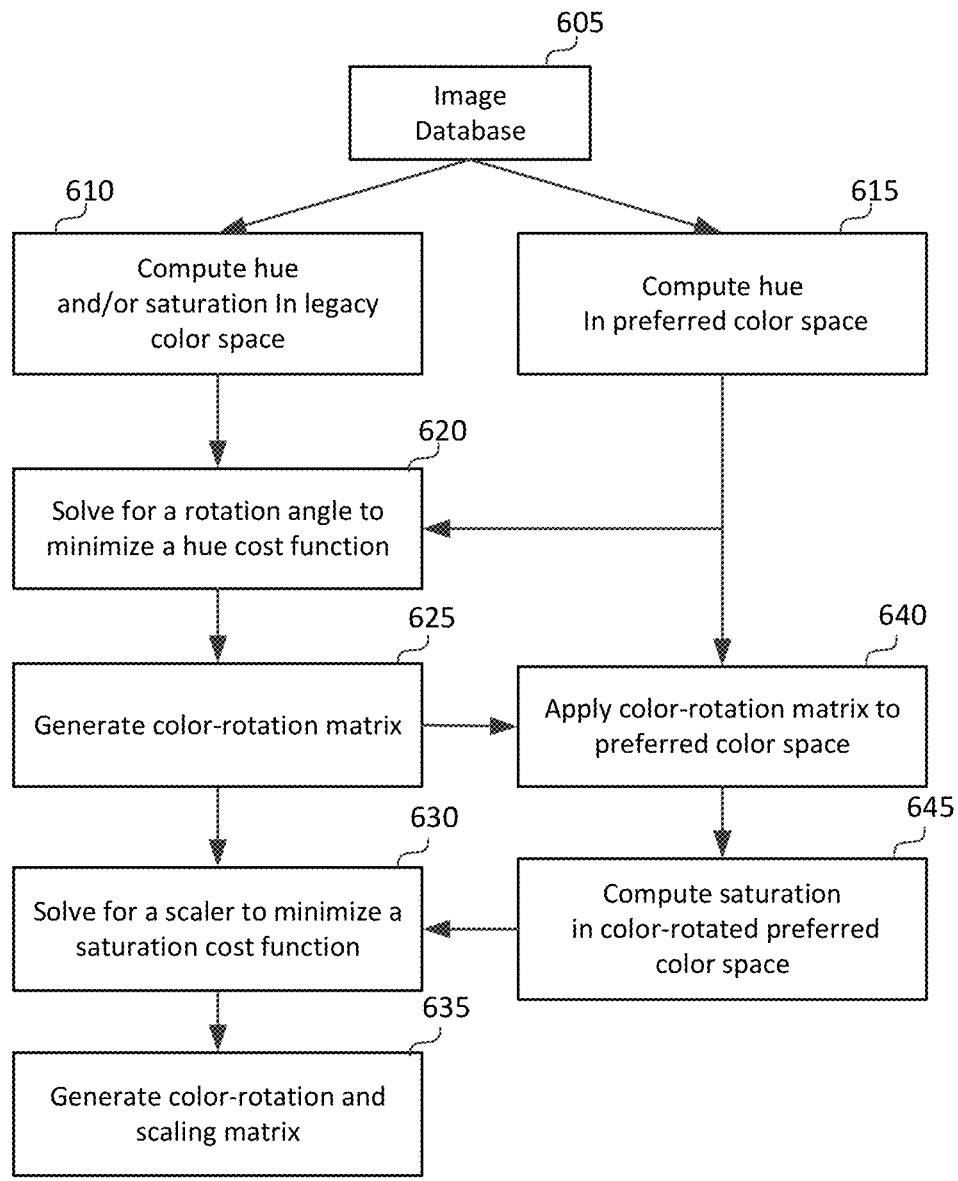
FIG. 6 depicts an example process flow for generating a color-rotation and scaling matrix according to an embodiment of this invention.

FIG. 6 depicts an example process flow for generating a color-rotation and scaling matrix according to an embodiment. Given an image database (605), step (610) computes hue and saturation values for the images in the database in a first (legacy) color space (e.g. YCbCr-gamma). Step (615) computes hue for the images in the database in a second (preferred) color space (e.g. IPT-PQ).

Given a hue-related cost function (e.g., equation (3)), step (620) solves for an optimum rotation angle a' according to a minimization cost criterion (such as mean square error (MSE)) which minimizes the distance between hues computed in the legacy color space and hues computed in a rotated preferred color space. In step (625) the value of a' is used to generate the color rotation matrix.

An optional saturation scaler may also be computed. Given a saturation cost function (e.g., equation 8), step (630), optionally, solves for an optimum scaler b' according to a minimization cost criterion, such as the MSE between the saturation of signals in the first color space and the saturation of scaled signals in a color-rotated preferred color space (640, 645).

Finally, in step (635), the rotation angle and the scaler are combined to generate a color-rotation and scaling matrix (e.g., equation (11)).

In an encoder, the encoder will apply the color-rotation and scaling matrix to the input data in the preferred color space to generate data in a reshaped color space. Data will be encoded (compressed) and transmitted to a decoder together with information related to the color-rotation and scaling matrix.

In a decoder, a legacy decoder will decode the data assuming it is coded in the legacy color space. Despite using the wrong color space information, images will still be viewable at adequate quality, albite in a lower dynamic range. A newer, fully-enabled, decoder may take advantage of the received metadata information on the color-rotation and scaling matrix to decode the image data in the preferred color space, thus providing to a viewer the full high-dynamic range of the data.

SEI Message Syntax for Reshaping Information

As discussed earlier, in one embodiment, the rotation (R) matrix and scaling vector(S) may be absorbed by the L'M'S' to I'P'T' conversion matrix in (230). The tone reshaping curve may be part of the forward color reshaping (305). In both cases, the adaptive reshaping information (that is, the matrix and the tone-mapping curve) may be transmitted by the encoder to the decoder using the syntax proposed in U.S. Provisional Application Ser. No. 62/193,390, filed on Jul. 16, 2015, also filed as PCT Application with Ser. No. PCT/US2016/02861 on Apr. 19, 2016, which is incorporated herein by reference in its entirety.

Figure 5:
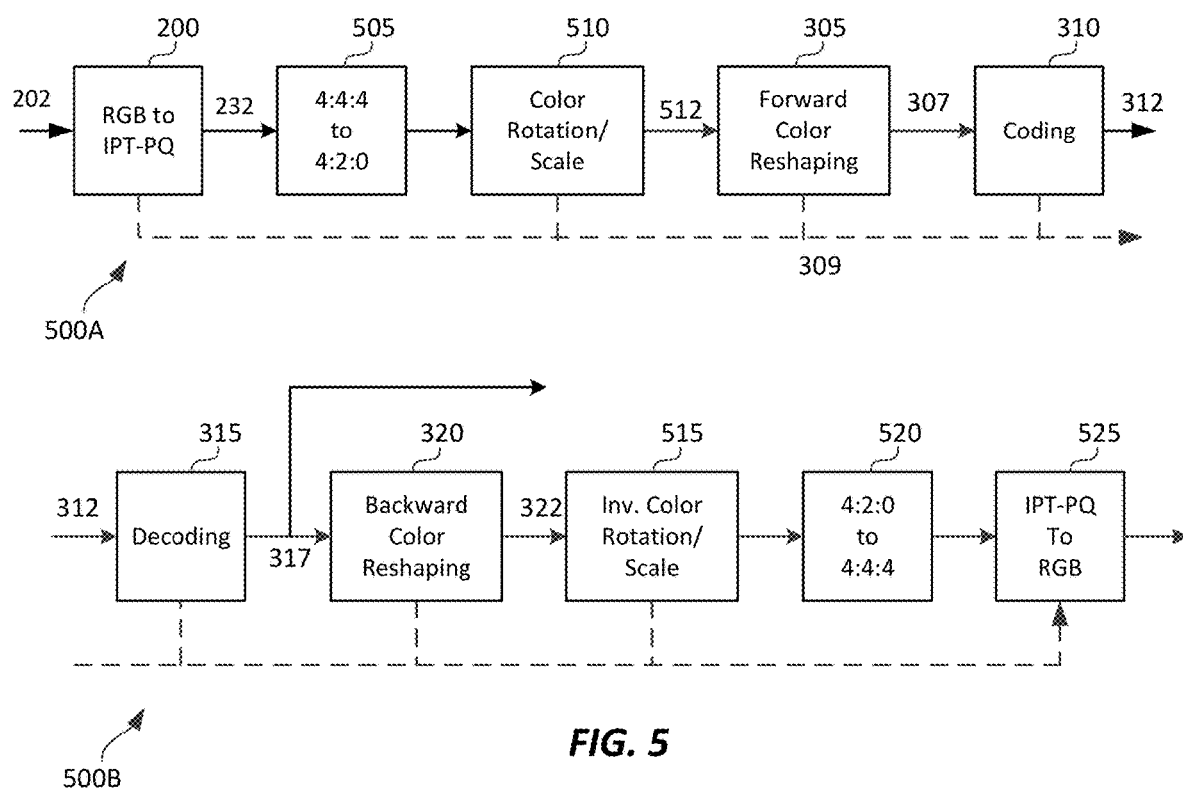
FIG. 5 depicts an example system for backward-compatible coding and decoding using color space reshaping according to an embodiment of this invention.

In another embodiment, as depicted in FIG. 5, a new color rotation and scale block (510) may be added in an encoder (500A). This block may be added after the color transformation (200) (e.g., RGB to IPT-PQ) but preferably before the forward reshaping (305). In a decoder (500B), a corresponding inverse color rotation and scaling block (515) may be added after the backward reshaping box (320). As depicted in FIG. 5, optional color format conversion boxes (e.g., 4:4:4 to 4:2:0 (505) or 4:2:0 to 4:4:4 (520)) may be added in the encoding and/or decoding pipeline as needed.

In terms of syntax, one may specify either a 3×3 rotation matrix or just a 2×2 matrix, since typically the luminance channel (e.g., Y or I) are left unchanged. Table 1 provides an example of SEI messaging to communicate a color rotation and scaling matrix; however, signaling is not limited in SEI message; it can be inserted in any high level syntax, like SPS, PPS, etc.

TABLE 1

Example SEI Messaging for color rotation and scaling matrix

| | Descriptor |
|---|---|
| Colour_Rotation_Scale_Table( ) {  | |
|   colour_rotation_scale_matrix_present_flag | u(1) |
|   if( colour_rotation_scale_matrix_present_flag ) { | |
|     for( c = 0; c < 2; c++ ) | |
|       for( i = 0; i < 2; i++ ) | |
|         colour_rotation_scale_coeffs[ c ][ i ] | i(16) |
|   } | |
| } | | colour_rotation_scale_matrix_present_flag equal to 1 indicates that the syntax elements colour_rotation_scale_coeffs [c][i], for c and i in the range of 0 to 1, inclusive, are present. colour_rotation_scale_matrix_present_flag equal to 0 indicates that the syntax elements colour_rotation_scale_coeffs [c][i], for c and i in the range of 0 to 1, inclusive, are not present.

colour_rotation_scale_coeffs [c][i] specifies the value of the two-by-two colour rotation and scale matrix coefficients. The value of colour_rotation_scale_coeffs [c][i] shall be in the range of $-2^{15}$ to $2^{15}-1$, inclusive. When colour_rotation_scale_coeffs [c][i] is not present, the default colour rotation and scale matrix is used.

In an embodiment, both the encoder and the decoder may be aware of the color-rotation and scaling matrix (e.g., through the mutual definition of a new color space), hence it may not be needed to signal the color-rotation matrix from an encoder to the decoder. In another embodiment, the color-rotation and scaling matrix can be referenced in VUI (Video Usability Information) together with IPT-PQ.

Multiple-Hue and Saturation Reshaping

In some embodiments, it may be beneficial to apply the reshaping on multiple hues. This will increase the accuracy of the reshaped color space to match the legacy colors, but at the expense of additional computations at the decoder. Consider for example the problem of optimizing the reshaping for N hues (e.g., skin tones, sky, greens, and the like). In an embodiment, one may repeat the processes discussed earlier to identify a set of optimal angles and saturations as a function of hue. For example, using database images for a variety of hues one may generate a set of optimal (rotation angle, saturation scale) values, e.g., $\{(a_1, b_1), (a_2, b_2), \ldots, (a_N, b_N)\}$. Or more generally, let for pixel p $$a(p)=f_H(h(p)),$$

$$b(p)=f_S(h(p)), \quad (14)$$

denote the optimal chroma (hue) rotation and saturation scaling values, where h(p) denotes a measure of hue for pixel p. For example, for the IPT-PQ color space, the $f_H$ and $f_S$ functions may be computed in terms of the hue h(p) and saturation s(p) functions:

$$h(p) = \tan^{-1}\left(\frac{T'(p)}{P'(p)}\right), \quad (15)$$

$$s(p) = \sqrt{T'(p)^2 + P(p)'^2}.$$

Functions $f_H(h(p))$ and $f_S(h(p))$ may be represented and stored in a variety of ways known in the art, for example, as look-up tables or piece-wise linear or non-linear polynomials, and can be signaled from an encoder to a decoder as metadata.

Given $f_H(h(p))$ and $f_S(h(p))$, the encoder applies the following reshaping functions to each pixel:

$$h'(p)=h(p)+a(p),$$

$$s'(p)=s(p)*b(p), \quad (16)$$

to generate the appropriate reshaped signal. For example, for the IPT-PQ color space, the reshaped P' and T' color components for pixel p may be derived using $$P'_r(p)=s'(p)\cos(h'(p)),$$

$$T'_r(p)=s'(p)\sin(h'(p)). \quad (17)$$

In a decoder, the process is reversed. For example, given $f_H(h(p))$ and $f_S(h(p))$, from equations (14) and (16), the decoder generates $$h(p)=h'(p)-a(p),$$

$$s(p)=s'(p)/b(p). \quad (18)$$

Note that to avoid a division in the decoder, in some embodiments the encoder may signal to the decoder the inverse of the $f_S(h(p))$ (e.g., 1/b(p) values). For input data in the IPT-PQ space, the original data may be generated as $$P(p)=s(p)\cos(h(p)),$$

$$T(p)=s(p)\sin(h(p)). \quad (19)$$

From equation (17), applying inverse reshaping to recover the data in the preferred color space requires trigonometric operations. In some embodiments, trigonometric operations may be performed using look-up tables. As an example, from equation (18), equation (19) may be rewritten as $$P(p)=s(p)\cos(h'(p)-a(p)),$$

$$T(p)=s(p)\sin(h'(p)-a(p)). \quad (20)$$

These operations may be further simplified using suitable look-up tables for computing the cosine and sine functions.

Figure 7A:
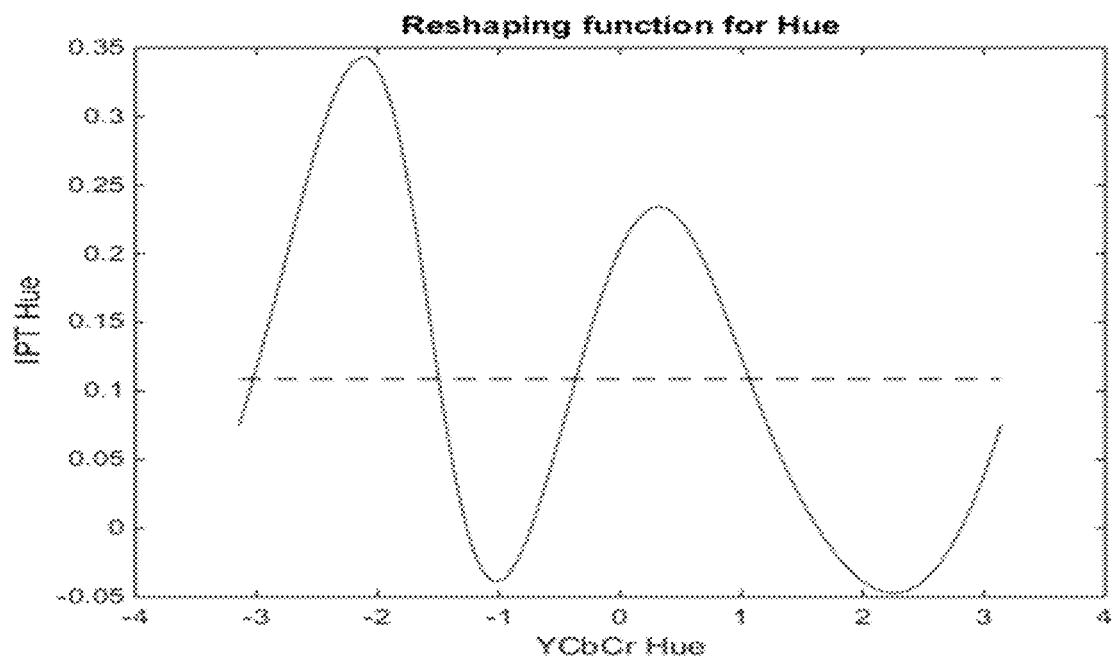
FIG. 7A and FIG. 7B depict hue and saturation reshaping functions according to an embodiment of this invention.
Figure 7B:
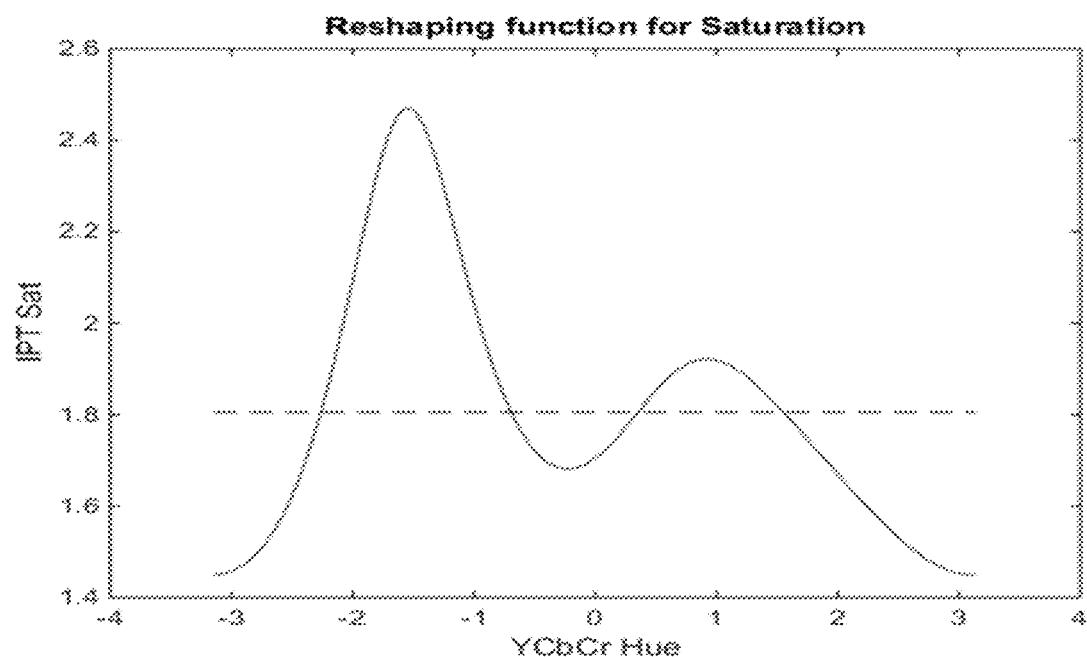
Figure 8:
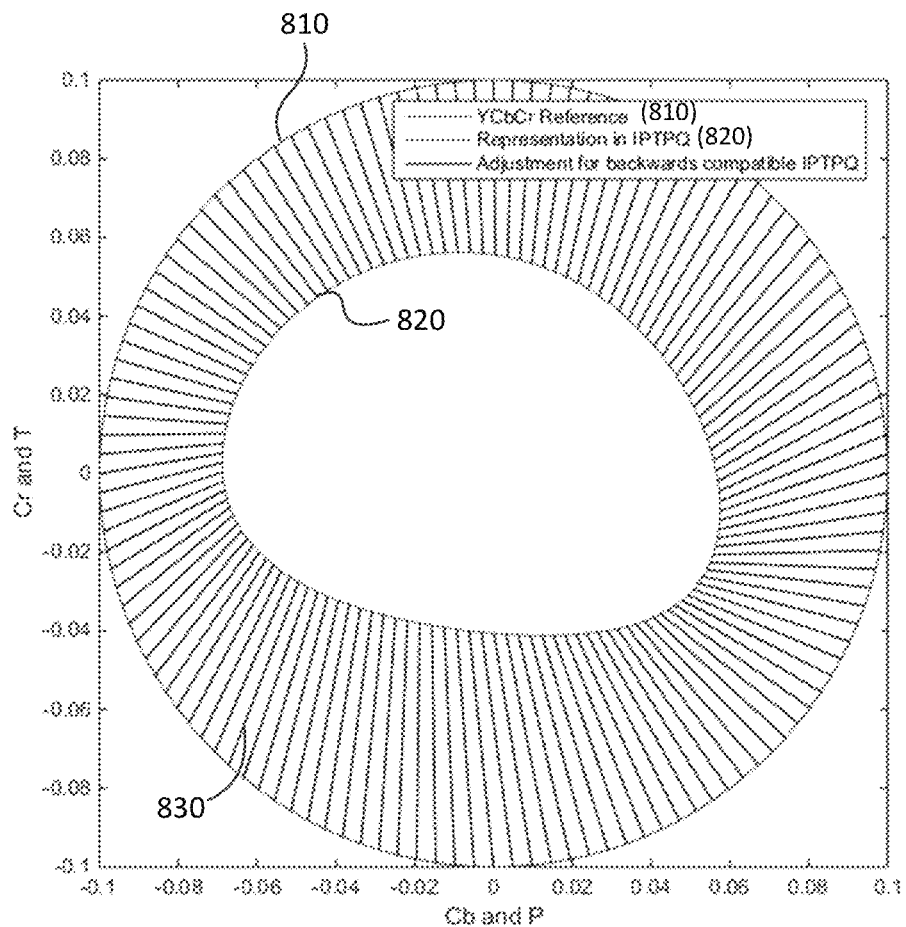
FIG. 8 depicts an example of hue and saturation reshaping between the IPT-PQ and YCbCr-gamma color spaces according to an embodiment of this invention.

FIG. 7A depicts an example backward reshaping function to convert hue from reshaped IPT-PQ-r (which appears as YCbCr to a legacy device) back to IPT-PQ when the legacy color space is YCbCr-gamma. FIG. 7B depicts the corresponding backward reshaping function to adjust the saturation. FIG. 8 depicts how the preferred color space IPT-PQ (820) may be adjusted to match the characteristics of the legacy YCbCr color space (810). Rays (830) depict the rotation and scaling.

In another embodiment, instead of computing P and T values in terms of cosine or sine functions of hue, one could construct a simpler decoder with look-up tables generated based on some other function of hue (e.g., $f(\tan^{-1}(h(p))))$. For example, given reshaped pixel value components $P'_r(p)$ and $T'_r(p)$, in an embodiment, the decoder may recover the original pixel values as follows:

$$S'_r(p) = \sqrt{T'_r(p)^2 + P'_r(p)'^2}, \quad (21)$$

$$R'_r(p) = \frac{T'_r(p)}{P'_r(p)},$$

$$P(p) = S'_r * v(R'_r(p)),$$

$$T(p) = S'_r * w(R'_r(p)),$$

where v( ) and w( ) denoted hue-related functions that were generated so that images in the reshaped color space match a set of hue and saturations in a legacy color space. The v( ) and w( ) functions, as before, can been communicated from the encoder to the decoder using metadata or they can be part of an established coding protocol or standard known by both the encoder and the decoder.

The $IC_TC_P$ Color Space $IC_TC_P$, also to be referred to as ICtCp (or IPT), is a proposed new color space especially designed for processing high dynamic range and wide color gamut (WCG) signals. As with ITP-PQ, I (Intensity) denotes the brightness of the PQ-encoded signal, $C_T$, Tritan Axis, corresponds to blue-yellow perception, and $C_P$, Protan Axis, corresponds to red-green color perception. In addition to the discussed features of IPT-PQ, in $IC_TC_P$:

As described earlier, chroma is rotated to align skin tones more closely to YCbCr The XYZ to LMS matrix is optimized for better uniformity and linearity for WCG images The L'M'S' to ICtCp matrix is optimized to improve isoluminance and stability with respect to HDR and WCG images As used herein, the term "isoluminance" refers to a measure of how well luminance (say, I of ICtCp or Y' of Y'Cb'Cr') correspond to luminance Y. Indirectly, it measures how well a color space separates luma from chroma. Experiments performed by the inventors indicate that/of ICtCp corresponds much closer to luma than Y' of Y'Cb'Cr'.

From an implementation point of view, using the $IC_TC_P$ color space requires the same hardware and signal flow as using the traditional gamma-coded YCbCr. For example, consider using gamma-corrected YCbCr (Y'Cb'Cr') in a camera pipeline. Starting from XYZ, the process requires the following steps:
a) Converting from XYZ to RGB BT.2020 using a 3×3 matrix
b) Applying an inverse EOTF (or OETF) to the output of step a); and
c) Applying a 3×3 matrix to the output of step b)

As depicted in FIG. 2, using the $IC_TC_P$ color requires the following steps:
a) In step (220), converting from XYZ to LMS using, in a preferred embodiment, the following 3×3 matrix:

$$\begin{bmatrix} 0.359 & 0.696 & -0.036 \\ -0.192 & 1.100 & 0.075 \\ 0.007 & 0.075 & 0.843 \end{bmatrix} \quad (22)$$

which corresponds to combining the XYZ to LMS 3×3 matrix of equation (1a) with a cross-talk matrix with c=0.04 (see also equation (1c)).
b) In step (225) converting signal (222) to L'M'S', as described earlier, by applying the PQ non-linearity
c) In step (230), converting from L'M'S' to $IC_TC_P$ using a 3×3 matrix, which in a preferred embodiment may be defined as:

$$\begin{bmatrix} 2048 & 2048 & 0 \\ 6610 & -13613 & 7003 \\ 17993 & -17390 & -543 \end{bmatrix} / 4096 = \begin{bmatrix} 0.5 & 0.5 & 0 \\ 1.614 & -3.323 & 1.710 \\ 4.378 & -4.246 & -0.135 \end{bmatrix}. \quad (23)$$

Equation (23) correspond to multiplying the rotation matrix of equation (12b) with the original L'M'S' to I'P'T' matrix of equation (2b).

In another embodiment, steps a) to c) can also be expressed as follows:

$$L'M'S' = \text{EOTF}_{ST2084}^{-1}[M * RGB_{BT.2020}], \quad (40)$$

where $$M = \begin{bmatrix} 1688 & 2146 & 262 \\ 683 & 2951 & 462 \\ 99 & 309 & 3688 \end{bmatrix} / 4096,$$

and $I = 0.5L' + 0.5M'$, $C_T = (6,610L' - 13,613M' + 7,003S')/4096$, $C_P = (17,933L' - 17,390M' - 543S')/4096$, (24)

where, $RGB_{BT.2020}$ denotes a triplet of RGB values in BT.2020, $\text{EOTF}_{ST2084}^{-1}$ denotes the inverse of the EOTF according to SMPTE ST 2084. In some embodiments, the $\text{EOTF}_{ST2084}^{-1}$ function may be replaced by another non-linear quantization function such as the Hybrid Log-Gamma (HLG) function. For complete reference, the appropriate equations are also summarized in Table 2, where the subscripts D refers to display light.

TABLE 2

Color Conversion to $IC_TC_P$

| Parameter | Values PQ |
|---|---|
| L, M, S Colour Space | L = (1688R + 2146G + 262B)/4096 |
| | M = (683R + 2951G + 462B)/4096 |
| | S = (99R + 309G + 3688B)/4096 |
| Derivation of L', M', S' | {L', M', S' } = EOTF$^{-1}$ (F$_D$) |
| | where F$_D$ = {L$_D$, M$_D$, S$_D$} |
| Derivation of I' | I = 0.5L' + 0.5M' |
| Derivation of colour difference signals | $C_T$ = (6610L' − 13613M' + 7003S')/4096 |
| | $C_P$ = (17933L' − 17390M' − 543S')/4096 |

The conversion from $IC_TC_P$ back to the original color space follows a similar approach, and in an embodiment it may include the following steps:
a) Convert from $IC_TC_P$ to L'M'S' using the inverse of equation (23) or $$\begin{bmatrix} 1 & 0.009 & 0.111 \\ 1 & -0.009 & -0.111 \\ 0.998 & 0.560 & -0.320 \end{bmatrix}. \quad (25)$$

b) Convert the L'M'S' signal to LMS using the signal's EOTF function (e.g., as defined in ST 2084; and
c) Convert from LMS to XYZ using the inverse of equation (22), for example:

$$\begin{bmatrix} 2.073 & -1.325 & 0.206 \\ 0.365 & 0.681 & -0.045 \\ -0.050 & -0.050 & 1.189 \end{bmatrix}. \quad (26)$$

In an embodiment, the corresponding L'M'S' to RGB and $IC_TC_P$ to L'M'S' matrices are given by:

$$\begin{pmatrix} R \\ G \\ B \end{pmatrix} = \begin{pmatrix} 3.436606694333078 & -2.506452118656270 & 0.069845424323191 \\ -0.791329555598929 & 1.983600451792291 & -0.192270896193362 \\ -0.025949899690593 & -0.098913714711726 & 1.124863614402319 \end{pmatrix} \begin{pmatrix} L' \\ M' \\ S' \end{pmatrix} \quad (27)$$

$$\begin{pmatrix} L' \\ M' \\ S' \end{pmatrix} = \begin{pmatrix} 1.0 & 0.008609037037933 & 0.111029620030260 \\ 1.0 & -0.008609037037933 & -0.111029625003026 \\ 1.0 & 0.560031335710679 & -0.320627174987319 \end{pmatrix} \begin{pmatrix} I \\ C_T \\ C_P \end{pmatrix} \quad (28)$$

Reference Display Management

Figure 9:
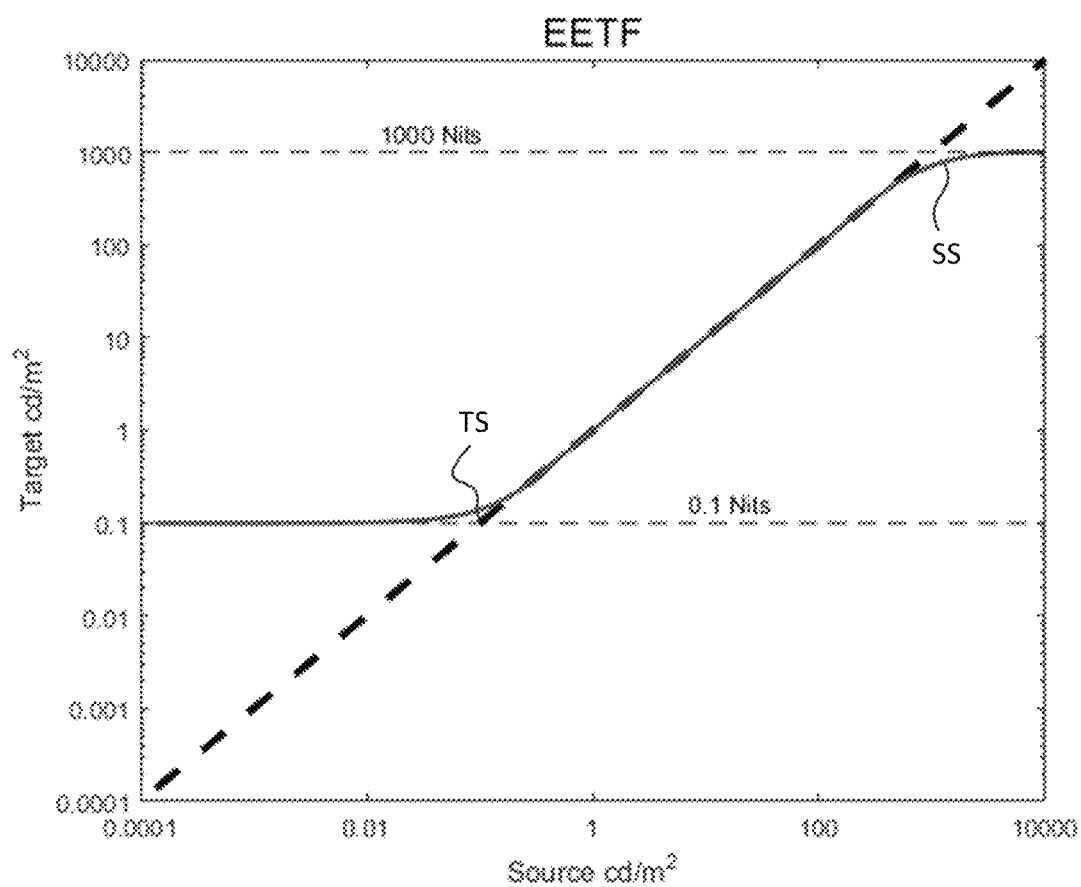
FIG. 9 depicts an example of an EETF function according to an embodiment of this invention.

High dynamic range content may be viewed on displays that have less dynamic range than the reference display used to master the content. In order to view HDR content on displays with a lower dynamic range, display mapping should be performed. This can take the form of an EETF (electrical-electrical transfer function) in the display, which is typically applied before applying the EOTF for the display. This function provides a toe and shoulder to gracefully roll off the highlights and shadows providing a balance between preserving the artistic intent and maintaining details. FIG. 9 is an example EETF mapping from the full 0-10,000 nits dynamic range to a target display capable of 0.1-1,000 nits. The EETF may be introduced into the PQ signal; the plots show the effect of the mapping, i.e. they illustrate how the intended light is changed into the actual displayed light.

Below are the mathematical steps that implement this tone mapping function for displays of various black and white luminance levels. The EETF may be applied in the non-linear domain to either the luma channel in $IC_TC_P$ or Y'C'BC'R or to RGB channels individually.

Calculating the EETF:

The central region of the tone mapping curve is defined as a one-to-one mapping from source to target. An additional toe and shoulder roll off are calculated using a Hermite spline to reduce the dynamic range to the capabilities of the target display.

The turning points (Toe Start (TS) and Shoulder Start (SS)) for the spline are defined first. These are the points where the roll offs begin. Let minLum and maxLum denote the minimum and maximum luminance values of the target display, then:

$$SS = 1.5*maxLum - 0.5$$

$$TS = 1.5*minLum$$

Given $E_1$, the source input signal in normalized PQ code words, the output $E_2$ is computed as follows.

For $0 \leq E_1 \leq TS$ $$X_1 = 0$$

$$Y_1 = minLum$$

$$X_2, Y_2 = TS$$

$$E_2 = P(E_1, X_1, Y_1, X_2, Y_2)$$

For $TS < E_1 < SS$ $$E_2 = E_1$$

For $SS \leq E_1 \leq 1$ $$X_1, Y_1 = SS$$

$$X_2 = 1$$

$$Y_2 = maxLum$$

$$E_2 = P(E_1, X_1, Y_1, X_2, Y_2)$$

Hermite Spline Equations:

$$T(A, X_1, X_2) = \frac{A - X_1}{X_2 - X_1}$$

$$B = (A, X_1, X_2)$$

$$P(B, Y_1, Y_2) = (2T(B)^3 - 3T(B)^2 + 1)Y_1 + (T(B)^3 - 2T(B)^2 + T(B))(X_2 - X_1) + (-2T(B)^3 + 3T(B)^2)Y_2$$

In another embodiment:
STEP 1:

$$E_2 = E_1 \text{ for } E_1 < SS$$

$$E_2 = P(E_1) \text{ for } SS \leq E_1 \leq 1$$

STEP 2:

$$E_3 = E_2 + TS*(1-E_2)^4 \text{ for } 0 \leq E_2 \leq 1$$

Hermite Spline Equations $$P(B) = (2T(B)^3 - 3T(B)^2 + 1)SS + (T(B)^3 - 2T(B)^2 + T(B))(1 - SS) + (-2T(B)^3 + 3T(B)^2)maxLum,$$

where $$T(A) = \frac{A - SS}{1 - SS}.$$

The resulting EETF curve can be applied to either the intensity I channel of $IC_TC_P$ or the luma Y channel of $Y'C'_BC'_R$. Here are some notable options:

1) I of $I_TC_P$—process of the intensity (I) channel of $IC_TC_P$ though the EETF $$I_2 = EETF(I_1)$$

Adjusts grayscale more accurately
No color shifts.
Changes in saturation will be needed and should be applied to the $C_T$ and $C_P$ channels using this equation:

$$C_{T2}, C_{P2} = \min\left(\frac{I_1}{I_2}, \frac{I_2}{I_1}\right) \times (C_{T1}, C_{P1})$$

2) Y' of $Y'C'_BC'_R$—process the luma Y' channel of $Y'C'_BC'_R$ though the EETF $$Y'_2 = EETF(Y'_1)$$

Adjusts grayscale more accurately
Limited color shifts
Changes in saturation will be needed and should be applied to the $C'_B$ and $C'_R$ channels using this equation:

$$C'_{B2}, C'_{R2} = \min\left(\frac{Y'_1}{Y'_2}, \frac{Y'_2}{Y'_1}\right) \times (C'_{B1}, C'_{R1})$$

Additional embodiments related to this invention are included in Appendix A of this Application.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images with enhanced dynamic range, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention.

For example, one or more processors in a display, an encoder, a set top box, a transcoder or the like may implement methods related to signal reshaping and coding of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient signal reshaping and coding of HDR images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for processing images with a processor, the method comprising:

receiving a coded bitstream comprising coded pictures;

decoding the coded bitstream to generate a decoded picture in a linear RGB color space;

generating a color picture in an LMS color space by applying an RGB to LMS color transformation to the decoded picture, wherein the RGB to LMS transformation comprises $$\begin{pmatrix} L \\ M \\ S \end{pmatrix} = \frac{\begin{pmatrix} 1688 & 2146 & 262 \\ 683 & 2951 & 462 \\ 99 & 309 & 3688 \end{pmatrix}}{4096} * \begin{pmatrix} R \\ G \\ B \end{pmatrix};$$

applying a non-linear function to each color component of the color picture to generate color components of a second color picture in a non-linear LMS color space, wherein the non-linear function comprises an inverse of an SMPTE ST 2084 electro-optical transfer function; and generating an output picture in an ICtCp color space by applying a color transformation matrix to the color components of the second color picture, wherein the color transformation matrix comprises:

$$\frac{\begin{bmatrix} 2048 & 2048 & 0 \\ 6610 & -13613 & 7003 \\ 17933 & -17390 & -543 \end{bmatrix}}{4096}.$$

2. The method of claim 1, wherein the linear RGB color space is a BT.2020 RGB color space.

* * * * *